United States Patent
Yang et al.

(10) Patent No.: US 11,895,600 B2
(45) Date of Patent: Feb. 6, 2024

(54) MAXIMUM POWER REDUCTION

(71) Applicant: LG ELECTRONICS INC., Seoul (KR)

(72) Inventors: Yoonoh Yang, Seoul (KR); Markus Pettersson, Seoul (KR); Sangwook Lee, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/137,750

(22) Filed: Apr. 21, 2023

(65) Prior Publication Data

US 2023/0345389 A1    Oct. 26, 2023

Related U.S. Application Data

(60) Provisional application No. 63/333,568, filed on Apr. 22, 2022.

(51) Int. Cl.
*H04W 52/36*    (2009.01)
*H04L 27/26*    (2006.01)

(52) U.S. Cl.
CPC ....... *H04W 52/367* (2013.01); *H04L 27/2636* (2013.01)

(58) Field of Classification Search
CPC ................ H04W 52/367; H04L 27/2636
See application file for complete search history.

(56) References Cited

U.S. PATENT DOCUMENTS

| | | | | |
|---|---|---|---|---|
| 2018/0124709 A1* | 5/2018 | Seo | ........... | H04W 52/30 |
| 2020/0280926 A1* | 9/2020 | Piipponen | ........... | H04W 52/16 |
| 2020/0314764 A1* | 10/2020 | Noh | ........... | H04W 52/146 |
| 2020/0314765 A1* | 10/2020 | Jung | ........... | H04W 52/367 |
| 2023/0042073 A1* | 2/2023 | Ibrahim | ........... | H04L 5/14 |

* cited by examiner

*Primary Examiner* — Harry H Kim
(74) *Attorney, Agent, or Firm* — BRYAN CAVE LEIGHTON PAISNER LLP

(57) ABSTRACT

One disclosure of the present specification provides user equipment (UE). The UE comprises: a transceiver to transmit a signal and to receive a signal; and a processor to control the transceiver, wherein the UE is a power class 2 UE or power class 3, wherein the processor determines transmission power based on MPR (maximum power reduction), wherein the transceiver transmits a signal with the transmission power in FR2-2, wherein the MPR is configured, based on channel bandwidth, RB (resource block) allocation and modulation type.

12 Claims, 13 Drawing Sheets

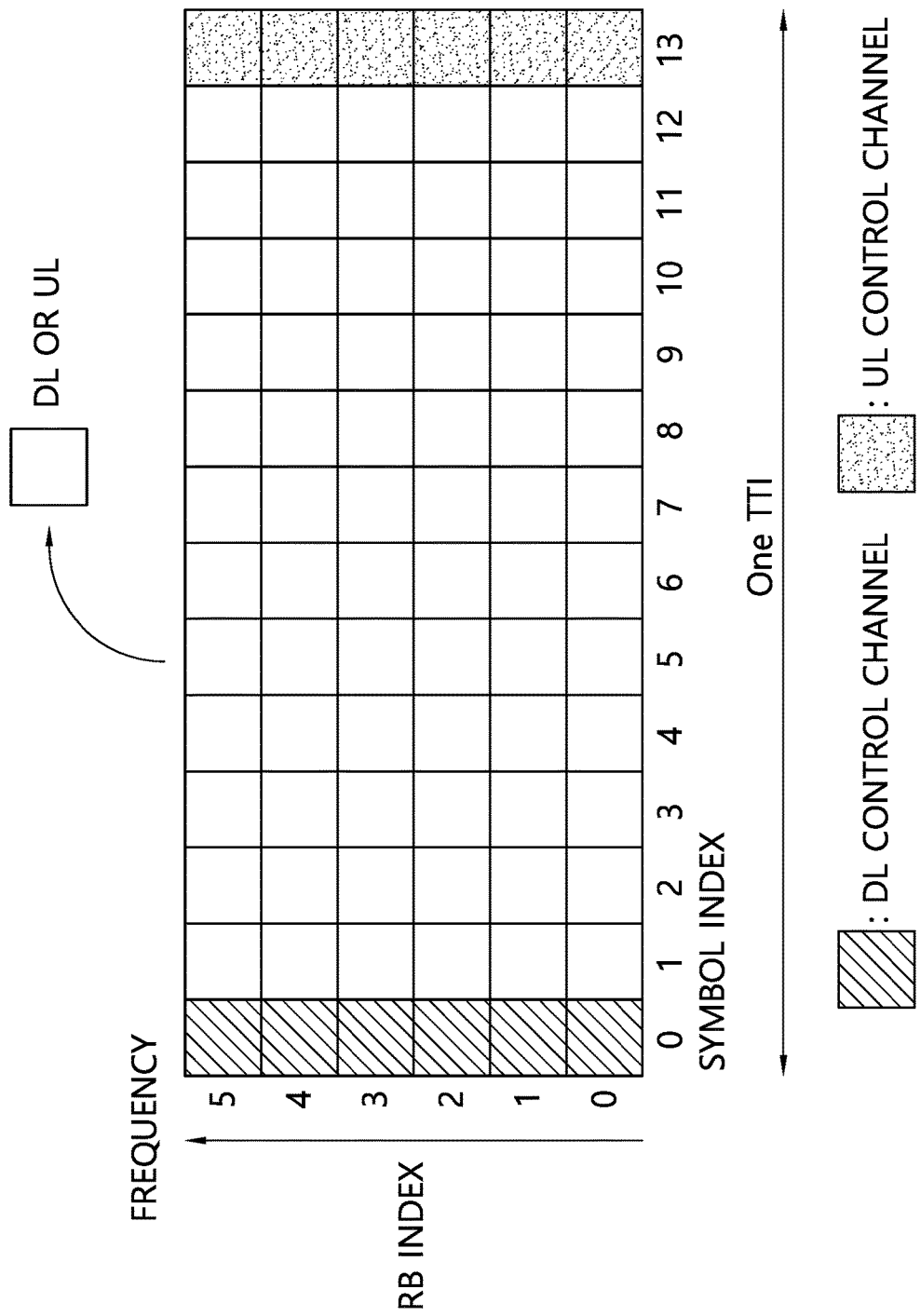

FIG. 10

1. receiving a signal from a UE

MAXIMUM POWER REDUCTION

CROSS-REFERENCE TO RELATED APPLICATIONS

This application claims the benefit of U.S. Provisional Application No. 63/333,568, filed on Apr. 22, 2022, the contents of which are all hereby incorporated by reference herein in their entirety.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In 5G NR, the terminal may determine transmit power by applying maximum output power requirements (or requirements). For example, the maximum output power requirement may be a Maximum Power Reduction (MPR) value.

The power class refers to the maximum power for all transmission bandwidths within the channel bandwidth of the NR carrier, and is measured in one subframe (1 ms) cycle.

Among the terminals supporting the FR2-2 band, there were no terminal RF performance standards for PC2 and PC3 terminals.

SUMMARY

Among the terminals supporting the FR2-2 band, a terminal RF performance standard, that is, MPR, for PC2 and PC3 terminals is proposed.

BRIEF DESCRIPTION OF THE DRAWINGS

FIG. 7 shows an example of subframe types in NR.

FIG. 10 shows a procedure of a base station according to the disclosure of the present specification.

DETAILED DESCRIPTION

Figure 1:
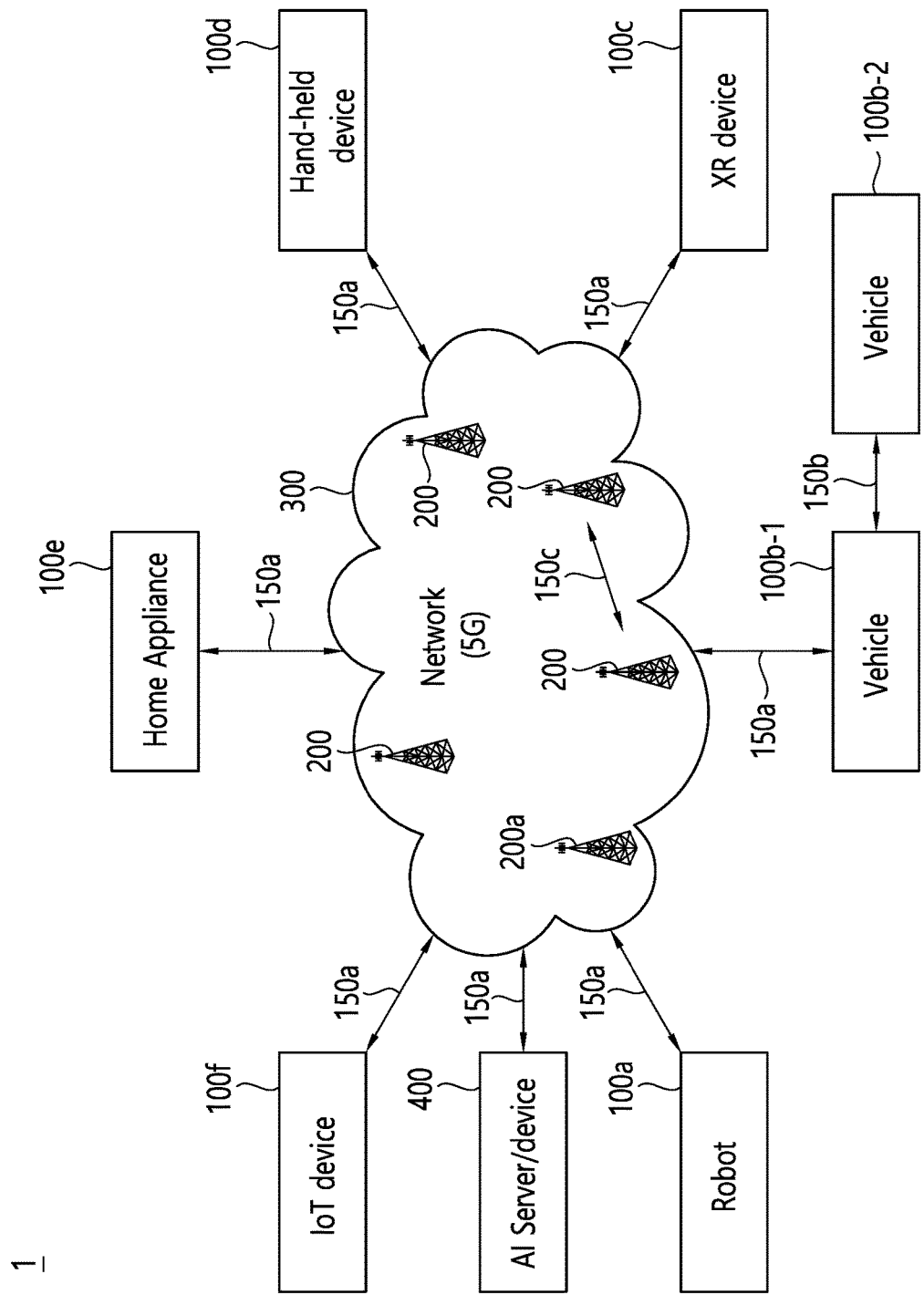
FIG. 1 shows an example of a communication system to which implementations of the present disclosure is applied.

The following techniques, apparatuses, and systems may be applied to a variety of wireless multiple access systems. Examples of the multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. CDMA may be embodied through radio technology such as Universal Terrestrial Radio Access (UTRA) or CDMA2000. TDMA may be embodied through radio technology such as Global System for Mobile communications (GSM), General Packet Radio Service (GPRS), or Enhanced Data rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802.20, or Evolved UTRA (E-UTRA). UTRA is a part of a Universal Mobile Telecommunications System (UMTS). 3rd Generation Partnership Project (3GPP) Long-Term Evolution (LTE) is a part of Evolved UMTS (E-UMTS) using E-UTRA. 3GPP LTE employs OFDMA in downlink (DL) and SC-FDMA in uplink (UL). Evolution of 3GPP LTE includes LTE-Advanced (LTE-A), LTE-A Pro, and/or 5G New Radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced Mobile BroadBand (eMBB), (2) a category of massive Machine Type Communication (mMTC), and (3) a category of Ultra-Reliable and Low Latency Communications (URLLC).

Referring to FIG. 1, the communication system 1 includes wireless devices 100a to 100f, Base Stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using Radio Access Technology (RAT) (e.g., 5G NR or LTE) and may be referred to as communication/radio/5G devices. The wireless devices 100a to 100f may include, without being limited to, a robot 100a, vehicles 100b-1 and 100b-2, an eXtended Reality (XR) device 100c, a hand-held device 100d, a home appliance 100e, an Internet-of-Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called User Equipments (UEs). A UE may include, for example, a cellular phone, a smartphone, a laptop computer, a digital broadcast terminal, a Personal Digital Assistant (PDA), a Portable Multimedia Player (PMP), a navigation system, a slate Personal Computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e g, channel encoding/decoding, modulation/demodulation, and resource mapping/de-mapping), and resource allocating processes, for transmitting/receiving radio signals, may be performed based on the various proposals of the present disclosure.

NR supports multiples numerologies (and/or multiple Sub-Carrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., Frequency Range 1 (FR1) and Frequency Range 2 (FR2). The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter Wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include NarrowBand IoT (NB-IoT) technology for low-power communication as well as LTE, NR and 6G. For example, NB-IoT technology may be an example of Low Power Wide Area Network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced MTC (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate Personal Area Networks (PANs) associated with small/low-power digital communication based on various specifications such as IEEE 802.15.4 and may be called various names.

Figure 2:
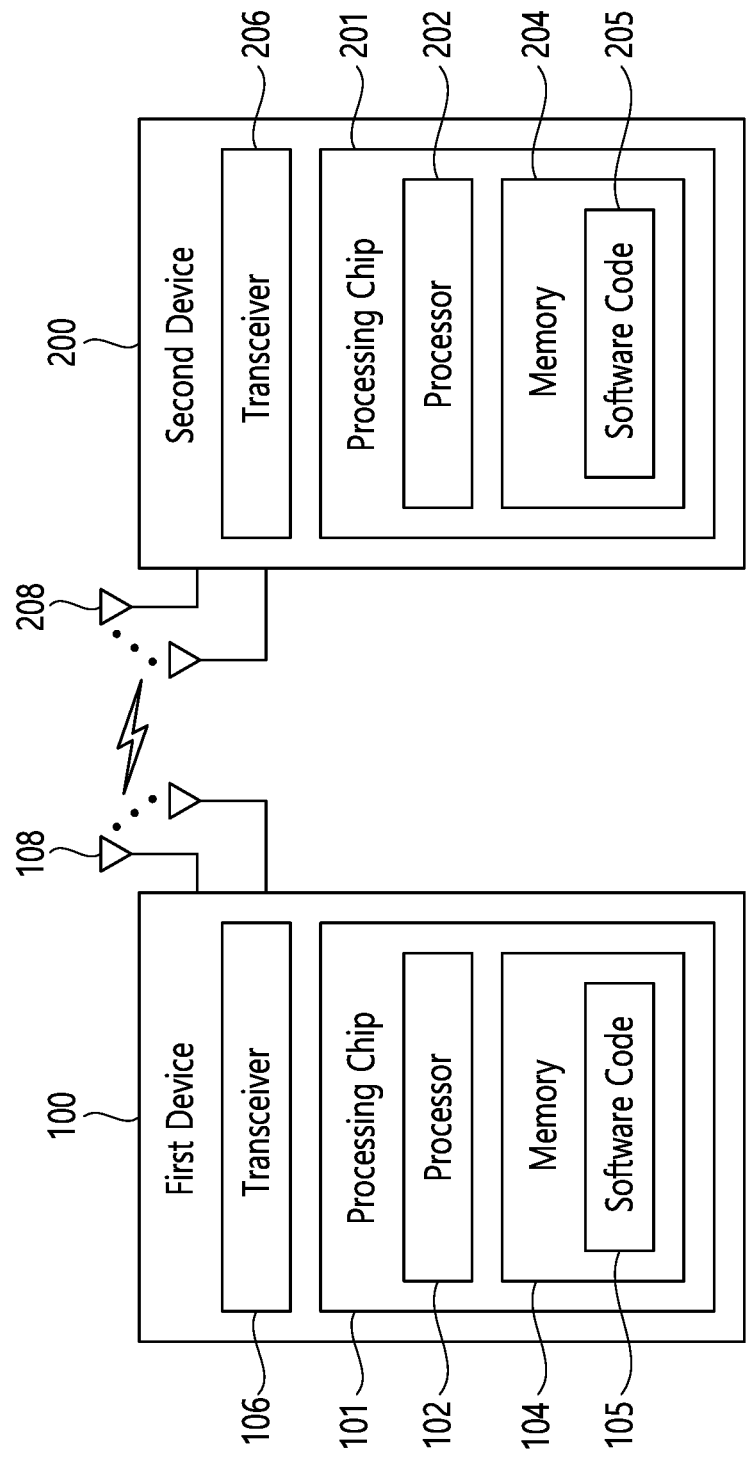
FIG. 2 shows an example of wireless devices to which implementations of the present disclosure is applied.

FIG. 2 shows an example of wireless devices to which implementations of the present disclosure is applied.

In FIG. 2, The first wireless device 100 and/or the second wireless device 200 may be implemented in various forms according to use cases/services. For example, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1. The first wireless device 100 and/or the second wireless device 200 may be configured by various elements, devices/parts, and/or modules.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. Additional and/or alternatively, the memory 104 may be placed outside of the processing chip 101.

The processor 102 may control the memory 104 and/or the transceiver 106 and may be adapted to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a firmware and/or a software code 105 which implements codes, commands, and/or a set of commands that, when executed by the processor 102, perform the descriptions, functions, procedures, suggestions, methods and/or operational flowcharts disclosed in the present disclosure. For example, the firmware and/or the software code 105 may implement instructions that, when executed by the processor 102, perform the descriptions, functions, procedures, suggestions, methods and/or operational flowcharts disclosed in the present disclosure. For example, the firmware and/or the software code 105 may control the processor 102 to perform one or more protocols. For example, the firmware and/or the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with Radio Frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. Additional and/or alternatively, the memory 204 may be placed outside of the processing chip 201.

The processor 202 may control the memory 204 and/or the transceiver 206 and may be adapted to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a firmware and/or a software code 205 which implements codes, commands, and/or a set of commands that, when executed by the processor 202, perform the descriptions, functions, procedures, suggestions, methods and/or operational flowcharts disclosed in the present disclosure. For example, the firmware and/or the software code 205 may implement instructions that, when executed by the processor 202, perform the descriptions, functions, procedures, suggestions, methods and/or operational flowcharts disclosed in the present disclosure. For example, the firmware and/or the software code 205 may control the processor 202 to perform one or more protocols. For example, the firmware and/or the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as Physical (PHY) layer, Media Access Control (MAC) layer, Radio Link Control (RLC) layer, Packet Data Convergence Protocol (PDCP) layer, Radio Resource Control (RRC) layer, and Service Data Adaptation Protocol (SDAP) layer). The one or more processors 102 and 202 may generate one or more Protocol Data Units (PDUs), one or more Service Data Unit (SDUs), messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. For example, the one or more processors 102 and 202 may be configured by a set of a communication control processor, an Application Processor (AP), an Electronic Control Unit (ECU), a Central Processing Unit (CPU), a Graphic Processing Unit (GPU), and a memory control processor.

The one or more memories 104 and 204 may be connected to the one or more processors 102 and 202 and store various types of data, signals, messages, information, programs, code, instructions, and/or commands. The one or more memories 104 and 204 may be configured by Random Access Memory (RAM), Dynamic RAM (DRAM), Read-Only Memory (ROM), electrically Erasable Programmable Read-Only Memory (EPROM), flash memory, volatile memory, non-volatile memory, hard drive, register, cash memory, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208. Additionally and/or alternatively, the one or more transceivers 106 and 206 may include one or more antennas 108 and 208. The one or more transceivers 106 and 206 may be adapted to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

Although not shown in FIG. 2, the wireless devices 100 and 200 may further include additional components. The additional components 140 may be variously configured according to types of the wireless devices 100 and 200. For example, the additional components 140 may include at least one of a power unit/battery, an Input/Output (I/O) device (e.g., audio I/O port, video I/O port), a driving device, and a computing device. The additional components 140 may be coupled to the one or more processors 102 and 202 via various technologies, such as a wired or wireless connection.

In the implementations of the present disclosure, a UE may operate as a transmitting device in Uplink (UL) and as a receiving device in Downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be adapted to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be adapted to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
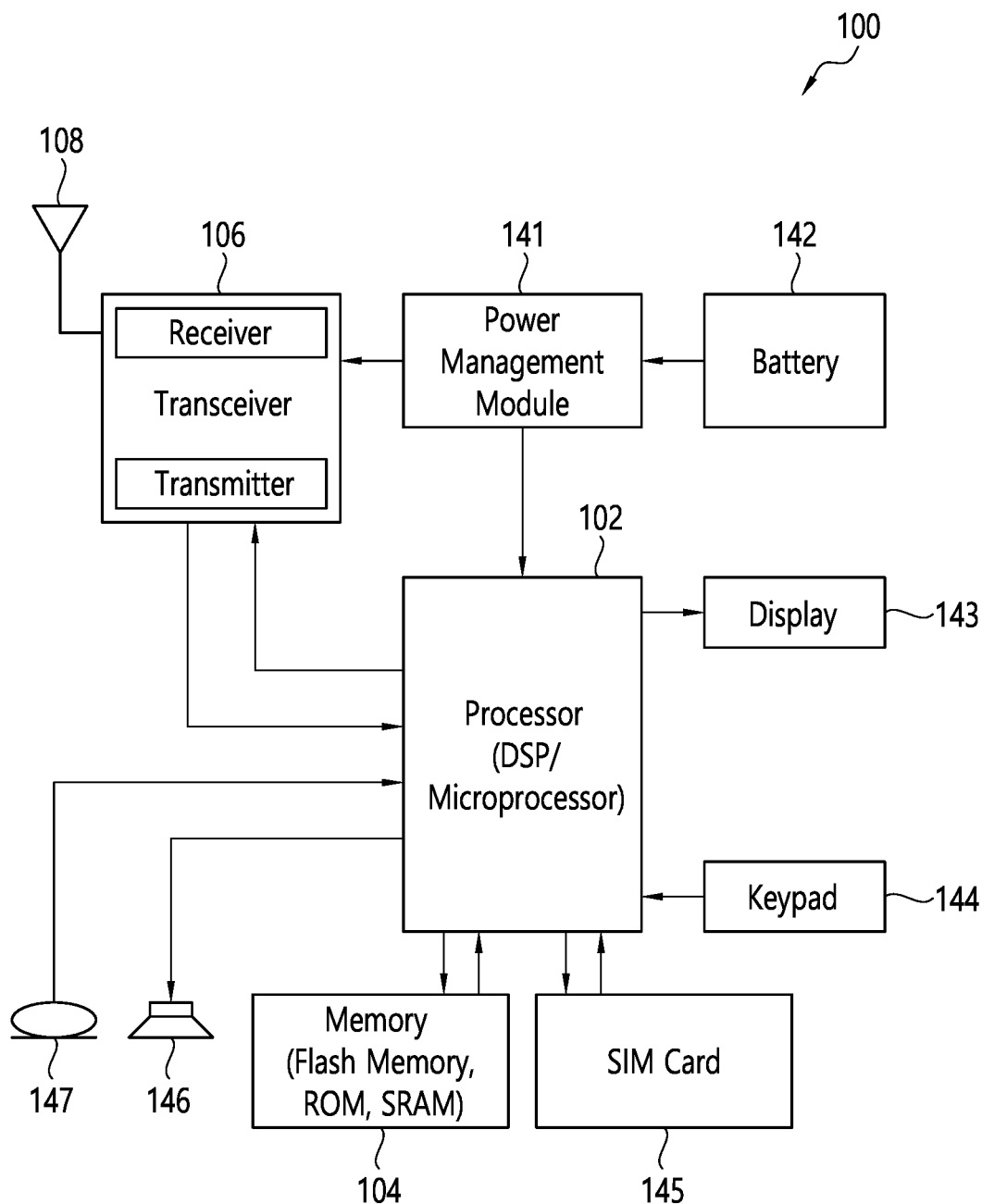
FIG. 3 shows an example of UE to which implementations of the present disclosure is applied.

FIG. 3 shows an example of UE to which implementations of the present disclosure is applied.

Referring to FIG. 3, a UE 100 may correspond to the first wireless device 100 of FIG. 2.

A UE 100 includes a processor 102, a memory 104, a transceiver 106, one or more antennas 108, a power management module 141, a battery 142, a display 143, a keypad 144, a Subscriber Identification Module (SIM) card 145, a speaker 146, and a microphone 147.

The processor 102 may be adapted to implement the descriptions, functions, procedures, suggestions, methods and/or operational flowcharts disclosed in the present disclosure. The processor 102 may be adapted to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of DSP, CPU, GPU, a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 141 manages power for the processor 102 and/or the transceiver 106. The battery 142 supplies power to the power management module 141.

The display 143 outputs results processed by the processor 102. The keypad 144 receives inputs to be used by the processor 102. The keypad 144 may be shown on the display 143.

The SIM card 145 is an integrated circuit that is intended to securely store the International Mobile Subscriber Identity (IMSI) number and its related key, which are used to identify and authenticate subscribers on mobile telephony devices (such as mobile phones and computers). It is also possible to store contact information on many SIM cards.

The speaker 146 outputs sound-related results processed by the processor 102. The microphone 147 receives sound-related inputs to be used by the processor 102.

Figure 4:
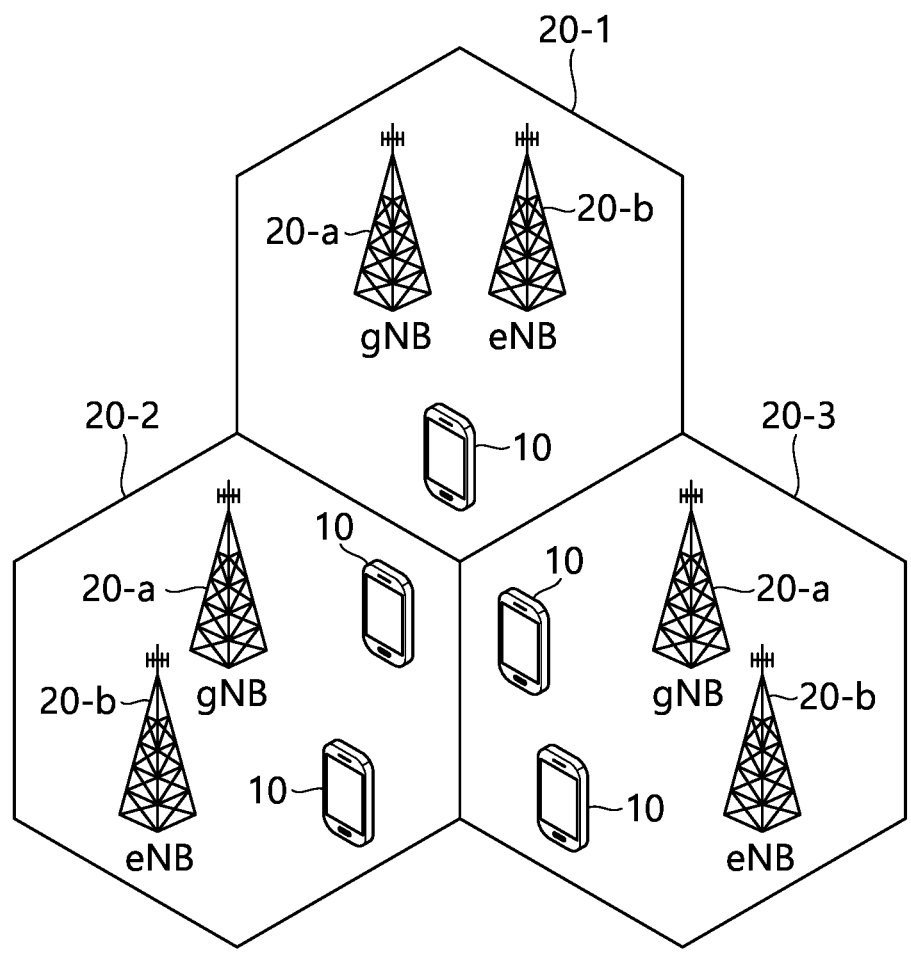
FIG. 4 is a wireless communication system.

FIG. 4 is a wireless communication system.

As can be seen with reference to FIG. 4, a wireless communication system includes at least one base station (BS). The BS is divided into a gNodeB (or gNB) 20a and an eNodeB (or eNB) 20b. The gNB 20a supports 5G mobile communication. The eNB 20b supports 4G mobile communication, that is, long term evolution (LTE).

Each base station 20a and 20b provides a communication service for a specific geographic area (commonly referred to as a cell) (20-1, 20-2, 20-3). A cell may in turn be divided into a plurality of regions (referred to as sectors).

A UE typically belongs to one cell, and the cell to which the UE belongs is called a serving cell. A base station providing a communication service to a serving cell is referred to as a serving base station (serving BS). Since the wireless communication system is a cellular system, other cells adjacent to the serving cell exist. The other cell adjacent to the serving cell is referred to as a neighbor cell. A base station that provides a communication service to a neighboring cell is referred to as a neighbor BS. The serving cell and the neighboring cell are relatively determined based on the UE.

Hereinafter, downlink means communication from the base station (20) to the UE (10), and uplink means communication from the UE (10) to the base station (20). In the downlink, the transmitter may be a part of the base station (20), and the receiver may be a part of the UE (10). In the uplink, the transmitter may be a part of the UE (10), and the receiver may be a part of the base station (20).

Meanwhile, a wireless communication system may be largely divided into a frequency division duplex (FDD) scheme and a time division duplex (TDD) scheme. According to the FDD scheme, uplink transmission and downlink transmission are performed while occupying different frequency bands. According to the TDD scheme, uplink transmission and downlink transmission are performed at different times while occupying the same frequency band. The channel response of the TDD scheme is substantially reciprocal. This means that the downlink channel response and the uplink channel response are almost the same in a given frequency domain. Accordingly, in the TDD-based wireless communication system, there is an advantage that the downlink channel response can be obtained from the uplink channel response. In the TDD scheme, since uplink transmission and downlink transmission are time-divided in the entire frequency band, downlink transmission by the base station and uplink transmission by the UE cannot be simultaneously performed. In a TDD system in which uplink transmission and downlink transmission are divided in subframe units, uplink transmission and downlink transmission are performed in different subframes.

<Operation Bands in NR>

The operating bands in NR are as follows.

The operating band of Table 3 below is an operating band converted from the operating band of LTE/LTE-A. This is called the FR1 band.

TABLE 3

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

The table below shows the NR operating bands defined on the high frequency phase. This is called the FR2 band.

TABLE 4

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |
| n262 | 47200 MHz-48200 MHz | 47200 MHz-48200 MHz | TDD |
| n263 | 57000 MHz-71000 MHz | 57000 MHz-71000 MHz | TDD |

Figure 5A:
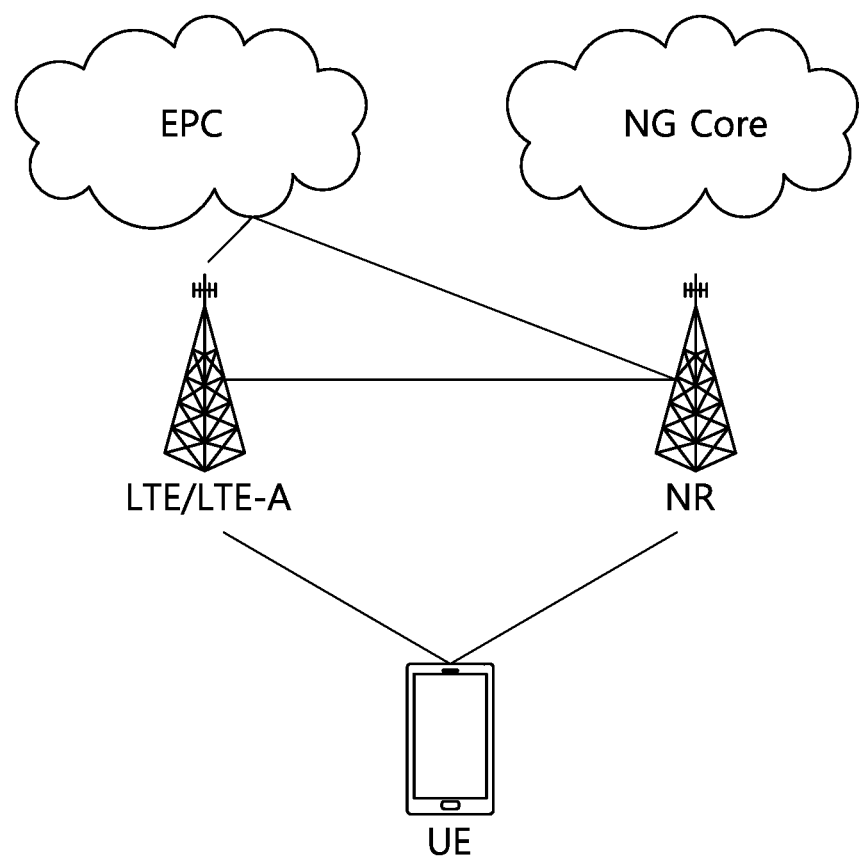
FIGS. 5a to 5c are exemplary diagrams illustrating an exemplary architecture for a service of next-generation mobile communication.
Figure 5B:
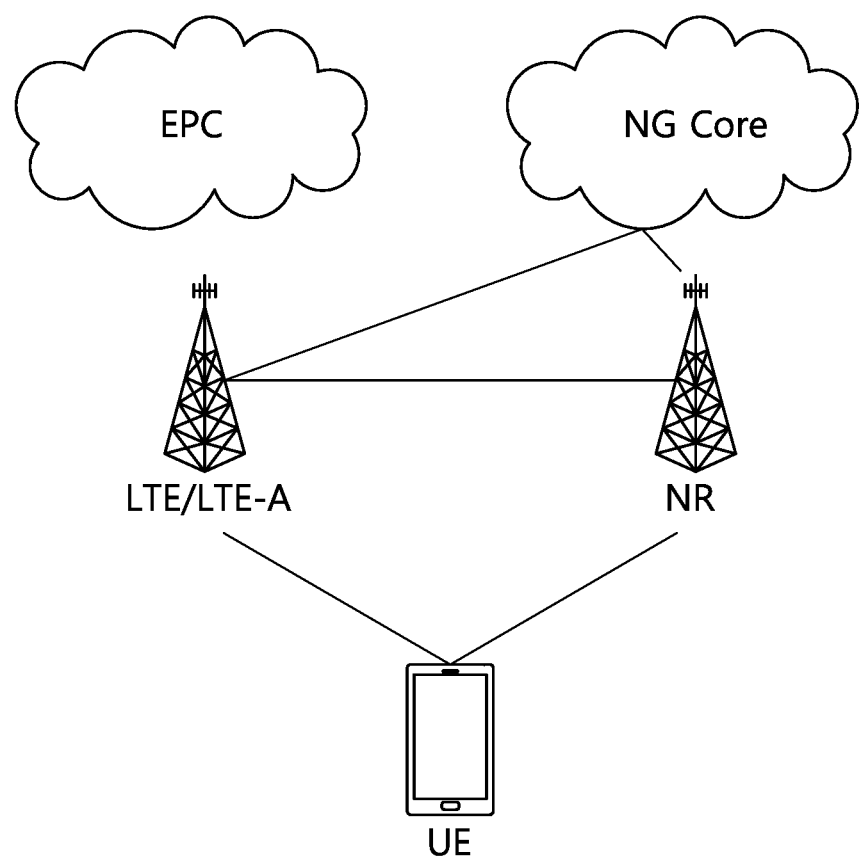
Figure 5C:
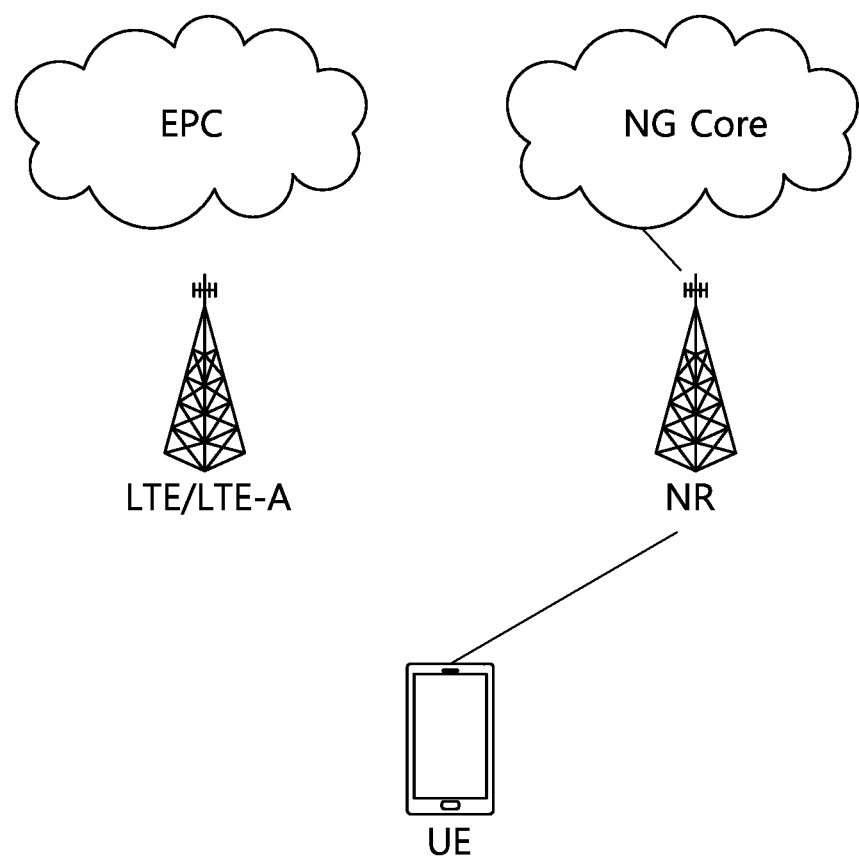

FIGS. 5a to 5c are exemplary diagrams illustrating an exemplary architecture for a service of next-generation mobile communication.

Referring to FIG. 5a, the UE is connected to the LTE/LTE-A-based cell and the NR-based cell in a DC (dual connectivity) manner.

The NR-based cell is connected to a core network for the existing 4G mobile communication, that is, the NR-based cell is connected an Evolved Packet Core (EPC).

Referring to FIG. 5b, unlike FIG. 5a, an LTE/LTE-A-based cell is connected to a core network for 5G mobile communication, that is, the LTE/LTE-A-based cell is connected to a Next Generation (NG) core network.

A service method based on the architecture shown in FIG. 5a and FIG. 5b is referred to as NSA (non-standalone).

Referring to FIG. 5c, UE is connected only to an NR-based cell. A service method based on this architecture is called SA (standalone).

Meanwhile, in the NR, it may be considered that reception from a base station uses downlink subframe, and transmission to a base station uses uplink subframe. This method can be applied to paired and unpaired spectra. A pair of spectrum means that two carrier spectrums are included for downlink and uplink operation. For example, in a pair of spectrums, one carrier may include a downlink band and an uplink band that are paired with each other.

Figure 6:
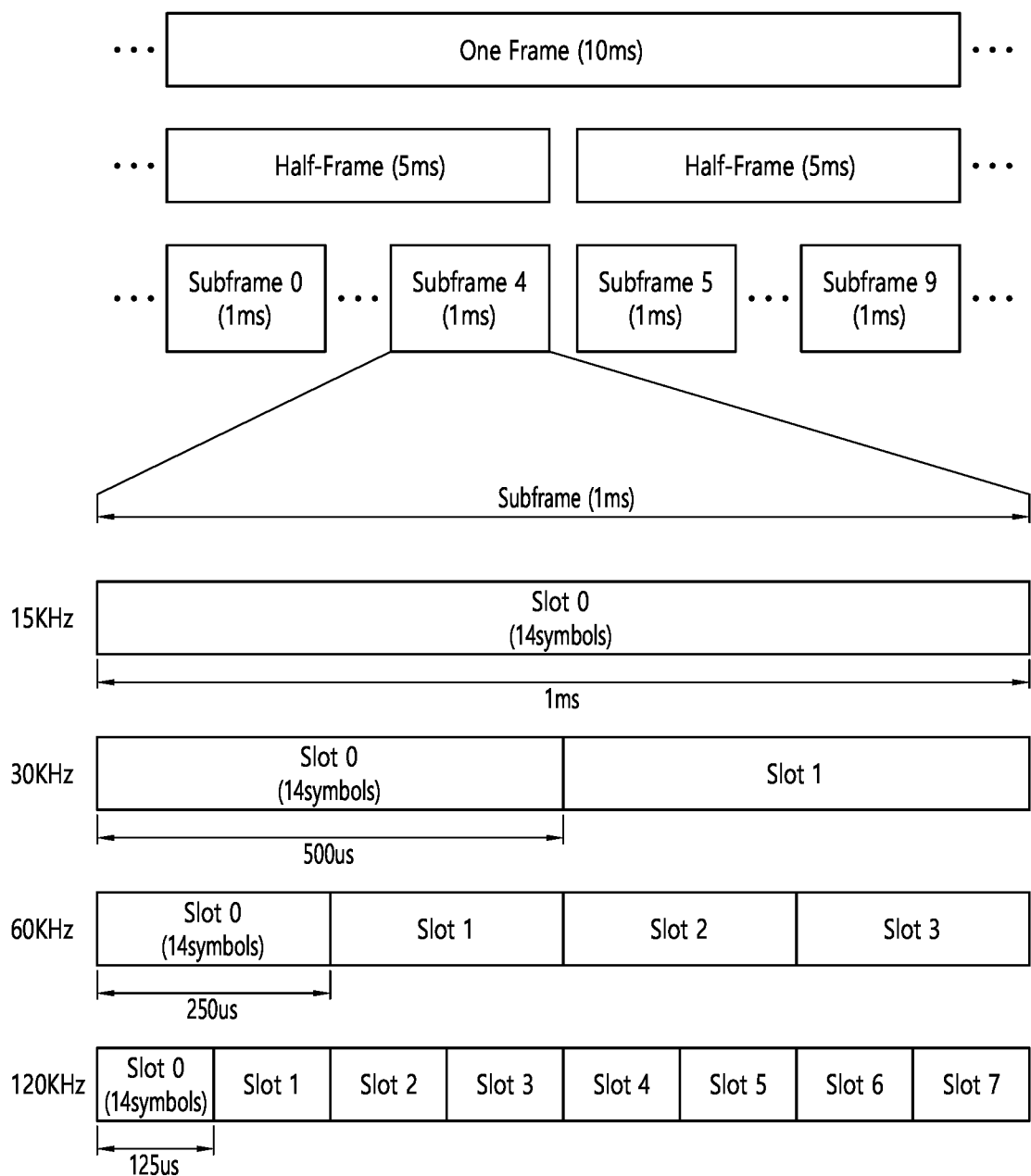
FIG. 6 illustrates structure of a radio frame used in NR.

FIG. 6 illustrates structure of a radio frame used in NR.

In NR, uplink and downlink transmission consists of frames. A radio frame has a length of 10 ms and is defined as two 5 ms half-frames (Half-Frame, HF). A half-frame is defined as 5 1ms subframes (Subframe, SF). A subframe is divided into one or more slots, and the number of slots in a subframe depends on SCS (Subcarrier Spacing). Each slot includes 12 or 14 OFDM(A) symbols according to CP (cyclic prefix). When CP is usually used, each slot includes 14 symbols. When the extended CP is used, each slot includes 12 symbols. Here, the symbol may include an OFDM symbol (or a CP-OFDM symbol) and an SC-FDMA symbol (or a DFT-s-OFDM symbol).

FIG. 7 shows an example of subframe types in NR.

The TTI (transmission time interval) shown in FIG. 7 may be referred to as a subframe or a slot for NR (or new RAT). The subframe (or slot) of FIG. 7 may be used in a TDD system of NR (or new RAT) to minimize data transmission delay. As shown in FIG. 7, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot).

The structure of such a subframe (or slot) may be referred to as a self-contained subframe (or slot).

Specifically, the first N symbols in a slot may be used to transmit DL control channel (hereinafter, DL control region), and the last M symbols in a slot may be used to transmit UL control channel (hereinafter, UL control region). N and M are each an integer greater than or equal to 0. A resource region (hereinafter, referred to as a data region) between the DL control region and the UL control region may be used for DL data transmission or UL data transmission. For example, the PDCCH may be transmitted in the DL control region and the PDSCH may be transmitted in the DL data region. The PUCCH may be transmitted in the UL control region, and the PUSCH may be transmitted in the UL data region.

When the structure of such subframe (or slot) is used, the time it takes to retransmit data in which a reception error occurs is reduced, so that the final data transmission latency can be minimized In such a self-contained subframe (or slot) structure, a time gap, from the transmission mode to the reception mode or from the reception mode to the transmission mode, may be required in a transition process. To this, some OFDM symbols when switching from DL to UL in the subframe structure may be set as a guard period (GP).

<Support of Various Numerologies>

The numerologies may be defined by a length of cycle prefix (CP) and a subcarrier spacing. One cell may provide a plurality of numerology to a UE. When an index of a numerology is represented by $\mu$, a subcarrier spacing and a corresponding CP length may be expressed as shown in the following table.

TABLE 5

| M | $\Delta f = 2\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by $\mu$, the number of OLDM symbols per slot $N^{slot}_{symb}$, the number of slots per frame $N^{frame,\mu}_{slot}$, and the number of slots per subframe $N^{subframe,\mu}_{slot}$ are expressed as shown in the following table.

TABLE 6

| $\mu$ | $N^{slot}_{symb}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by $\mu$, the number of OLDM symbols per slot $N^{slot}_{symb}$, the number of slots per frame $N^{frame,\mu}_{slot}$, and the number of slots per subframe $N^{subframe,\mu}_{slot}$ are expressed as shown in the following table.

TABLE 7

| M | $N^{slot}_{symb}$ | $N^{frame, \mu}_{slot}$ | $N^{subframe, \mu}_{slot}$ |
|---|---|---|---|
| 2 | 12 | 40 | 4 |

<Maximum Output Power>

The UE power class (PC) in Table 8 defines the maximum output power for all transmission bandwidths within the channel bandwidth of the NR carrier unless otherwise specified. The measurement period may be at least one subframe (1 ms).

TABLE 8

| NR band | Class 1 (dBm) | Tolerance (dB) | Class 2 (dBm) | Tolerance (dB) | Class 3 (dBm) | Tolerance (dB) |
|---|---|---|---|---|---|---|
| n1 | | | | | 23 | ±2 |
| n2 | | | | | 23 | ±23 |
| n3 | | | | | 23 | ±23 |
| n5 | | | | | 23 | ±2 |
| n7 | | | | | 23 | ±23 |
| n8 | | | | | 23 | ±23 |
| n12 | | | | | 23 | ±23 |
| n14 | 31 | +2/−3 | | | 23 | ±23 |
| n18 | | | | | 23 | ±2 |
| n20 | | | | | 23 | ±23 |
| n25 | | | | | 23 | ±23 |
| n26 | | | | | 23 | ±23 |

TABLE 8-continued

| NR band | Class 1 (dBm) | Tolerance (dB) | Class 2 (dBm) | Tolerance (dB) | Class 3 (dBm) | Tolerance (dB) |
|---|---|---|---|---|---|---|
| n28 | | | | | 23 | +2/−2.5 |
| n30 | | | | | 23 | ±2 |
| n34 | | | | | 23 | ±2 |
| n38 | | | | | 23 | ±2 |
| n39 | | | | | 23 | ±2 |
| n40 | | | | | 23 | ±2 |
| n41 | | | 26 | +2/−33 | 23 | ±23 |
| n48 | | | | | 23 | +2/−3 |
| n50 | | | | | 23 | ±2 |
| n51 | | | | | 23 | ±2 |
| n53 | | | | | 23 | ±2 |
| n65 | | | | | 23 | ±2 |
| n66 | | | | | 23 | ±2 |
| n70 | | | | | 23 | ±2 |
| n71 | | | | | 23 | +2/−2.5 |
| n74 | | | | | 23 | ±2 |
| n77 | | | 26 | +2/−3 | 23 | +2/−3 |
| n78 | | | 26 | +2/−3 | 23 | +2/−3 |
| n79 | | | 26 | +2/−3 | 23 | +2/−3 |
| n80 | | | | | 23 | ±2 |
| n81 | | | | | 23 | ±2 |
| n82 | | | | | 23 | ±2 |
| n83 | | | | | 23 | +2/−2.5 |
| n84 | | | | | 23 | ±2 |
| n86 | | | | | 23 | ±2 |
| n89 | | | | | 23 | ±2 |
| n91 | | | | | 23 | +23, 4 |
| n92 | | | | | 23 | +23, 4 |
| n93 | | | | | 23 | +23, 4 |
| n94 | | | | | 23 | +23, 4 |
| n95 | | | | | 23 | ±2 |

NOTE 1:
A power class is the specified maximum UE power without taking tolerance into account.
NOTE 2:
Power class 3 is the default power class unless otherwise specified.
NOTE 3:
Referring to the transmission bandwidth bounded within $F_{UL\_low}$ and $F_{UL\_low}$ + 4 MHz or $F_{UL\_high}$ − 4 MHz and $F_{UL\_high}$, the maximum output power requirement is relaxed by reducing the lower tolerance limit by 1.5 dB.
NOTE 4:
The maximum output power requirement is relaxed by reducing the lower tolerance limit by 0.3 dB.

The case where the UE supports a power class different from the basic UE power class for the band, and the supported power class activates a higher maximum output power than the basic power class is as follows.

- If there is no UE capability maxUplinkDutyCycle-PC2-FR1 field and the ratio of uplink symbols transmitted in a specific evaluation period is greater than 50% (the exact evaluation cycle is more than one radio frame); or
- If there is no UE capability maxUplinkDutyCycle-PC2-FR1 field and the ratio of uplink symbols transmitted in a specific evaluation period is greater than the defined maxUplinkDutyCycle-PC2-FR1 (the exact evaluation cycle is 1 or more radio frames); or
- If a defined IE P-Max is provided and set to maximum output power below the default power class
- All requirements for the basic power class must be applied to the supported power class and the transmit power must be set.
- Otherwise, the defined IE P-Max is not provided or set to a value higher than the maximum output power of the default power class, and the percentage of uplink symbols transmitted in a specific evaluation period is less than or equal to maxUplinkDutyCycle-PC2-FR1. or
- If no defined IE P-Max is provided or is set to a value higher than the maximum output power of the default power class and the percentage of uplink symbols transmitted in a particular evaluation period is equal to 50% or if maxUplinkDutyCycle-PC2-FR1 is not present. (Exact evaluation period is one or more radio frames):

All requirements for supported power classes must be applied and transmit power must be set.

<Maximum Power Reduction (MPR) and Allowed Additional MPR (A-MPR)>

Figure 8A:
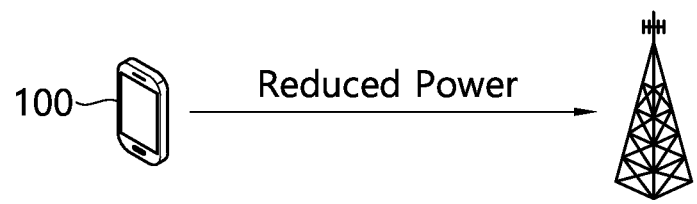
FIGS. 8a and 8b show an example of a method of limiting the transmission power of the UE.
Figure 8B:
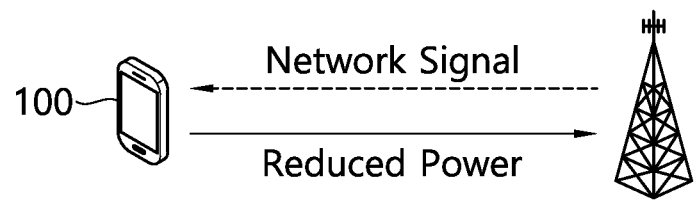

FIGS. 8a and 8b show an example of a method of limiting the transmission power of the UE.

Referring to FIG. 8a, the UE 100 may perform transmission with limited transmission power. For example, the UE 100 may perform uplink transmission to the base station through reduced transmission power.

When the peak-to-average power ratio (PAPR) value of the signal transmitted from the UE 100 increases, in order to limit the transmission power, the UE 100 applies a maximum output power reduction (MPR) value to the transmission power. By doing so, it is possible to reduce the linearity of the power amplifier PA inside the transceiver of the UE 100.

Referring to FIG. 8b, a base station (BS) may request the UE 100 to apply A-MPR by transmitting a network signal (NS) to the UE 100. In order not to affect adjacent bands, etc., an operation related to A-MPR may be performed. Unlike the MPR described above, the operation related to the A-MPR is an operation in which the base station additionally performs power reduction by transmitting the NS to the UE 100 operating in a specific operating band. That is, when the UE to which MPR is applied receives the NS, the UE may additionally apply A-MPR to determine transmission power.

Problems to be Solved in the Disclosure of the Present Specification

In FR2-1 (24250 MHz to 52600 MHz), UE power class and UE type are assumed as follows.

TABLE 9

| UE Power class(PC) | UE type |
|---|---|
| 1 | Fixed wireless access (FWA) UE |
| 2 | Vehicular UE |
| 3 | Handheld UE |
| 4 | High power non-handheld UE |
| 5 | Fixed wireless access (FWA) UE |
| 6 | High Speed Train Roof-Mounted UE |
| 7 | RedCap UE |

Note:
RedCap variants of non-RedCap UEs are not precluded

The same power class according to the UE type may also be applied to FR2-2. That is, FR2-2 power class 2 may be a vehicular UE, and power class 3 may be a handheld UE.

A band corresponding to FR2-2 may be n263 shown in Table 4.

Among the terminals supporting the n263 operating band, which is FR2-2, the terminal RF performance standards of PC2 and PC3 terminals are required.

Disclosure of the Present Specification

Currently, the 3GPP standardization organization is working on the UE RF standard for the Rel-17 FR2-2 (Frequency Range 2-2: 52600 MHz to 71000 MHz) band. This is a proposal for MPR and other RF standards for vehicular UE corresponding to power class 2 and handheld UE corresponding to power class 3. That is, Tx RF standards for handheld terminals and vehicular terminals supporting n263 may be proposed.

1. TRP (Total Radiated Power) and EIRP (Effective Isotropically Radiated Power)

The current UE maximum output power limit may be specified as maximum TRP and maximum EIRP for FR2. The UE maximum output power limits in FR2 are shown in Table 10.

TABLE 10

| Operating band | PC1 (FWA) | | PC2 (Vehicular UE) | | PC3 (Handheld UE) | | PC4 (High power non-handheld) | | PC5 (FWA) | | PC6 (HST Roof-Mounted UE) | | PC7 (RedCap UE) | |
|---|---|---|---|---|---|---|---|---|---|---|---|---|---|---|
| | Max TRP (dBm) | Max EIRP (dBm) | Max TRP (dBm) | Max EIRP (dBm) | Max TRP (dBm) | Max EIRP (dBm) | Max TRP (dBm) | Max EIRP (dBm) | Max TRP (dBm) | Max EIRP (dBm) | Max TRP (dBm) | Max EIRP (dBm) | Max TRP (dBm) | Max EIRP (dBm) |
| n257 | 35 | 55 | 23 | 43 | 23 | 43 | 23 | 43 | 23 | 43 | 23 | 43 | 23 | 43 |
| n258 | 35 | 55 | 23 | 43 | 23 | 43 | 23 | 43 | 23 | 43 | 23 | 43 | 23 | 43 |
| n259 | | | | | 23 | 43 | | | 23 | 43 | | | | |
| n260 | 35 | 55 | | | 23 | 43 | 23 | 43 | | | | | | |
| n261 | 35 | 55 | 23 | 43 | 23 | 43 | 23 | 43 | | | 23 | 43 | 23 | 43 |
| n262 | 35 | 55 | 23 | 43 | 23 | 43 | 23 | 43 | | | | | | |

To ensure EN max EIRP and TRP for FR2-2, UE maximum output power limits for n263 may be proposed as follows.

TABLE 11

| | |
|---|---|
| Maximum power level EIRP | 40 dBm[1] |
| Maximum power level TRP | 25 dBm |
| Maximum power spectral density (EIRP) | 23 dBm/MHz[2] |

Note[1]:
Exception to 55 dBm if only fixed outdoor installations with ≥30 dB transmit directivity Note[2]:
Exception to 38 dBm/MHz if only fixed outdoor installations with ≥30 dB transmit directivity Proposal 1: UE maximum output power limits for n263

PC1

Max TRP=25 dBm & Max EIRP=55 dBm for fixed outdoor installations with ≥30 dB transmit directivity Max TRP=25 dBm & Max EIRP=40 dBm in other cases

PC2

Max TRP=25 dBm & Max EIRP=40 dBm

PC3

Max TRP=25 dBm & Max EIRP=40 dBm

2. MPR

In FR2-1, the PC3 MPR may be applied to PC2 considering that the Max TRP of PC3 is the same as that of PC2. For FR2-2, suggest using the same approach may be proposed. That is, it may be proposed to first agree on an MPR for PC3 and then apply the same value to PC2.

Proposal 2: Apply FR2-2 PC3 MPR to PC2.

The MPR of the PC3 UE proposed below may be equally applied to the PC2 UE.

For FR2-2 PC3 MPR, the agreement of FR2-1 may be considered with extended CBW (800 MHz, 1600 MHz and 2000 MHz) as follows.

Table 12 shows the MPR delta due to excess BW.

TABLE 12

| | | MPR | | | | |
|---|---|---|---|---|---|---|
| Waveform | Modulation | 50M/100M/200M | 400M | 800M | 1600M | 2000M |
| DFT-s-OFMD | shaped pi/2 BPSK | <=X1 | <=X1 + Y | <=X1 + Y1 | <=X1 + Y2 | <=X1 + Y3 |
| DFT-s-OFMD | pi/2 BPSK | <=X2 | <=X2 + Y | <=X2 + Y1 | <=X2 + Y2 | <=X2 + Y3 |
| DFT-s-OFMD | QPSK | <=X3 | <=X3 + Y | <=X3 + Y1 | <=X3 + Y2 | <=X3 + Y3 |
| DFT-s-OFMD | 16QAM | <=X4 | <=X4 + Y | <=X4 + Y1 | <=X4 + Y2 | <=X4 + Y3 |
| CP-OFDM | QPSK | <=X5 | <=X5 + Y | <=X5 + Y1 | <=X5 + Y2 | <=X5 + Y3 |
| CP-OFDM | 16QAM | <=X6 | <=X6 + Y | <=X6 + Y1 | <=X6 + Y2 | <=X6 + Y3 |
| DFT-s-OFMD | 64QAM | <=X7 | <=X7 + Y | <=X7 + Y1 | <=X7 + Y2 | <=X7 + Y3 |
| CP-OFDM | 64QAM | <=X8 | <=X8 + Y | <=X8 + Y1 | <=X8 + Y2 | <=X8 + Y3 |

Table 13 summarizes the current PC3 MPR requirements in FR2-1.

TABLE 13

| Modulation | | $MPR_{WT}, BW_{channel} \leq 200$ MHz | | $MPR_{WT}, BW_{channel} = 400$ MHz | |
|---|---|---|---|---|---|
| | | Inner RB allocations, Region 1 | Edge RB allocations | Inner RB allocations, Region 1 | Edge RB allocations |
| DFT-s-OFDM | Pi/2 BPSK | 0.0 | ≤2.0 | 0.0 | ≤3.0 |
| | QPSK | 0.0 | ≤2.0 | 0.0 | ≤3.0 |
| | 16 QAM | ≤3.0 | ≤3.5 | ≤4.5 | ≤4.5 |
| | 64 QAM | ≤5.0 | ≤5.5 | ≤6.5 | ≤6.5 |
| CP-OFDM | QPSK | ≤3.5 | ≤4.0 | ≤5.0 | ≤5.0 |
| | 16 QAM | ≤5.0 | ≤5.0 | ≤6.5 | ≤6.5 |
| | 64 QAM | ≤7.5 | ≤7.5 | ≤9.0 | ≤9.0 |

Considering the Max TRP difference of 2 dB between FR2-1 and FR2-2, FR2-1 PC3 MPR for CBW of 200 MHz and 400 MHz may be reused for FR2-2.

$MPR_{WT}$ means MPR for Wideband Transmission (WT).

For CBW of 800 MHz, 1600 MHz and 2000 MHz, it may be suggested to consider 3 dB, 4 dB and 4 dB for Y1, Y2 and Y3 respectively. In FR2-1, Y of 1.5 dB may be considered for CBW of 400 MHz (in table 13, difference of i) DFT-s-OFDM (16 QAM and 64 QAM) and CP-OFDM (QPSK, 16 QAM and 64 QAM) at $MPR_{WT}, BW_{channel} \leq 200$ MHz and ii) FT-s-OFDM (16 QAM and 64 QAM) and CP-OFDM (QPSK, 16 QAM and 64 QAM) at $MPR_{WT}, BW_{channel} = 400$ MHz). For Edge RB allocations, in case of Pi/2 BPSK and QPSK for DFT-s-OFDM, 4 dB, 5 dB and 5 dB may be suggested for each CBW of 800 MHz, 1600 MHz and 2000 MHz considering the limiting criterion of IBE.

Proposal 3: For FR2-2 PC3 MPR,
    For CBW of 100 MHz and 400 MHz
        Reuse FR2-1 PC3 MPR for FR2-2 PC3 MPR
    For CBW of 800 MHz, 1600 MHz and 2000 MHz
        Consider 3 dB(Y1), 4 dB(Y2) and 4 dB(Y3) as MPR delta (in Table 3.4) respectively.
        For Edge RB allocations, in case of Pi/2 BPSK and QPSK in DFT-s-OFDM, consider 4 dB, 5 dB and 5 dB respectively The above suggestions are shown in Table 14, Table 15 and Table 16.

Proposal 3a: For FR2-2 PC3 MPR, propose with Table 14, Table 15 and Table 16

TABLE 14

| Modulation | | $MPR_{WT}, BW_{channel} = 100$ MHz | | $MPR_{WT}, BW_{channel} = 400$ MHz | |
|---|---|---|---|---|---|
| | | Inner RB allocations, Region 1 | Edge RB allocations | Inner RB allocations, Region 1 | Edge RB allocations |
| DFT-s-OFDM | Pi/2 BPSK | 0.0 | ≤2.0 | 0.0 | ≤3.0 |
| | QPSK | 0.0 | ≤2.0 | 0.0 | ≤3.0 |
| | 16 QAM | ≤3.0 | ≤3.5 | ≤4.5 | ≤4.5 |
| | 64 QAM | ≤5.0 | ≤5.5 | ≤6.5 | ≤6.5 |
| CP-OFDM | QPSK | ≤3.5 | ≤4.0 | ≤5.0 | ≤5.0 |
| | 16 QAM | ≤5.0 | ≤5.0 | ≤6.5 | ≤6.5 |
| | 64 QAM | ≤7.5 | ≤7.5 | ≤9.0 | ≤9.0 |

TABLE 15

| Modulation | | $MPR_{WT}, BW_{channel} = 800$ MHz | | $MPR_{WT}, BW_{channel} = 1600$ MHz | |
|---|---|---|---|---|---|
| | | Inner RB allocations, Region 1 | Edge RB allocations | Inner RB allocations, Region 1 | Edge RB allocations |
| DFT-s-OFDM | Pi/2 BPSK | 0.0 | ≤4.0 | 0.0 | ≤5.0 |
| | QPSK | 0.0 | ≤4.0 | 0.0 | ≤5.0 |
| | 16 QAM | ≤6.0 | ≤6.0 | ≤7.0 | ≤7.0 |
| | 64 QAM | ≤8.0 | ≤8.0 | ≤9.0 | ≤9.0 |
| CP-OFDM | QPSK | ≤6.5 | ≤6.5 | ≤7.5 | ≤7.5 |
| | 16 QAM | ≤8.0 | ≤8.0 | ≤9.0 | ≤9.0 |
| | 64 QAM | ≤10.5 | ≤10.5 | ≤11.5 | ≤11.5 |

TABLE 16

| | | MPR$_{WT}$, BW$_{channel}$ = 2000 MHz | |
|---|---|---|---|
| Modulation | | Inner RB allocations, Region 1 | Edge RB allocations |
| DFT-s-OFDM | Pi/2 BPSK | 0.0 | ≤5.0 |
| | QPSK | 0.0 | ≤5.0 |
| | 16 QAM | ≤7.0 | ≤7.0 |
| | 64 QAM | ≤9.0 | ≤9.0 |
| CP-OFDM | QPSK | ≤7.5 | ≤7.5 |
| | 16 QAM | ≤9.0 | ≤9.0 |
| | 64 QAM | ≤11.5 | ≤11.5 |

Alternatively, it may be proposed as shown in Tables 17-19 in consideration of the margin (z).

Proposal 3b: For FR2-2 PC3 MPR, propose with Tables 17-19

TABLE 17

| | | MPR$_{WT}$, BW$_{channel}$ = 100 MHz | | MPR$_{WT}$, BW$_{channel}$ = 400 MHz | |
|---|---|---|---|---|---|
| Modulation | | Inner RB allocations, Region 1 | Edge RB allocations | Inner RB allocations, Region 1 | Edge RB allocations |
| DFT-s-OFDM | Pi/2 BPSK | 0.0 | ≤2.0 + z1 | 0.0 | ≤3.0 + z1 |
| | QPSK | 0.0 | ≤2.0 + z1 | 0.0 | ≤3.0 + z1 |
| | 16 QAM | ≤3.0 + z2 | ≤3.5 + z2 | ≤4.5 + z2 | ≤4.5 + z2 |
| | 64 QAM | ≤5.0 + z2 | ≤5.5 + z2 | ≤6.5 + z2 | ≤6.5 + z2 |
| CP-OFDM | QPSK | ≤3.5 + z2 | ≤4.0 + z2 | ≤5.0 + z2 | ≤5.0 + z2 |
| | 16 QAM | ≤5.0 + z2 | ≤5.0 + z2 | ≤6.5 + z2 | ≤6.5 + z2 |
| | 64 QAM | ≤7.5 + z2 | ≤7.5 + z2 | ≤9.0 + z2 | ≤9.0 + z2 |

TABLE 18

| | | MPR$_{WT}$, BW$_{channel}$ = 800 MHz | | MPR$_{WT}$, BW$_{channel}$ = 1600 MHz | |
|---|---|---|---|---|---|
| Modulation | | Inner RB allocations, Region 1 | Edge RB allocations | Inner RB allocations, Region 1 | Edge RB allocations |
| DFT-s-OFDM | Pi/2 BPSK | 0.0 | ≤4.0 + z1 | 0.0 | ≤5.0 + z1 |
| | QPSK | 0.0 | ≤4.0 + z1 | 0.0 | ≤5.0 + z1 |
| | 16 QAM | ≤6.0 + z2 | ≤6.0 + z2 | ≤7.00 + z2 | ≤7.0 + z2 |
| | 64 QAM | ≤8.0 + z2 | ≤8.0 + z2 | ≤9.00 + z2 | ≤9.0 + z2 |
| CP-OFDM | QPSK | ≤6.5 + z2 | ≤6.5 + z2 | ≤7.50 + z2 | ≤7.5 + z2 |
| | 16 QAM | ≤8.0 + z2 | ≤8.0 + z2 | ≤9.00 + z2 | ≤9.0 + z2 |
| | 64 QAM | ≤10.5 + z2 | ≤10.5 + z2 | ≤11.50 + z2 | ≤11.5 + z2 |

TABLE 19

| | | MPR$_{WT}$, BW$_{channel}$ = 2000 MHz | |
|---|---|---|---|
| Modulation | | Inner RB allocations, Region 1 | Edge RB allocations |
| DFT-s-OFDM | Pi/2 BPSK | 0.0 | ≤5.0 + z1 |
| | QPSK | 0.0 | ≤5.0 + z1 |
| | 16 QAM | ≤7.0 + z2 | ≤7.0 + z2 |
| | 64 QAM | ≤9.0 + z2 | ≤9.0 + z2 |
| CP-OFDM | QPSK | ≤7.5 + z2 | ≤7.5 + z2 |
| | 16 QAM | ≤9.0 + z2 | ≤9.0 + z2 |
| | 64 QAM | ≤11.5 + z2 | ≤11.5 + z2 | z1 in Tables 17-19 may be one of {0.0, 0.1, 0.2, 0.3, 0.4, 0.5, 0.6, 0.7, 0.8, 0.9, 1.0}.

z2 in Tables 17-19 may be one of {−0.5, −0.4, −0.3, −0.2, −0.1, 0.0, 0.1, 0.2, 0.3, 0.4, 0.5, 0.6, 0.7, 0.8, 0.9, 1.0}.

For transmission bandwidth configuration equal to 100 MHz, the following parameters may be defined to specify the effective RB allocation range for RB allocation in Tables 14-16 or Tables 17-19:

RB$_{Start,Low}$=max(1, L$_{CRB}$), where max( ) indicates the largest value of all arguments.

RB$_{Start,High}$=N$_{RB}$−RB$_{Start,Low}$−L$_{CRB}$,

If the RB allocation belonging to Tables 14-16 or Tables 17-19 is as follows, it may correspond to region 1 inner RB allocation:

RB$_{Start,Low}$≤RB$_{Start}$≤RB$_{Start,High}$, and L$_{CRB}$≤ceil(N$_{RB}$/3), where ceil(x) is the smallest integer greater than or equal to x.

For transmission bandwidth configuration equal to or larger than 400 MHz, N$_{RB}$ is the maximum number of RBs for a given Channel bandwidth and sub-carrier spacing defined in Table 20.

TABLE 20

| SCS (kHz) | 100 MHz N$_{RB}$ | 400 MHz N$_{RB}$ | 800 MHz N$_{RB}$ | 1600 MHz N$_{RB}$ | 2000 MHz N$_{RB}$ |
|---|---|---|---|---|---|
| 120 | 66 | 264 | N/A | N/A | N/A |
| 480 | N/A | 66 | 132 | 264 | N/A |
| 960 | N/A | 33 | 66 | 132 | [156] |

RB$_{end}$ may be as follows: RB$_{end}$=RB$_{start}$+L$_{CRB}$−1

If the RB allocation belonging to Tables 14-16 or Tables 17-19 is as follows, it may correspond to region 1 inner RB allocation.

$RB_{start} \geq \text{Ceil}(\frac{1}{4} \, N_{RB})$ and $RB_{end} < \text{Ceil}(\frac{3}{4} \, N_{RB})$ and $L_{CRB} \leq \text{Ceil}(\frac{1}{4} \, N_{RB})$ In all transmission bandwidth configurations, if $L_{CRB}$ with a length between 1 and Ceil ($\frac{1}{4} \, N_{RB}$) are located from $RB_{start}$ to $RB_{end}$, it may correspond to region 1 inner RB allocation.

In all transmission bandwidth configurations, if the RB allocation is not the region 1 inner RB allocation, it may correspond to the edge RB allocation.

MPR for contiguous allocation may be defined as:

$MPR = \max(MPR_{WT}, MPR_{narrow})$

For transmission bandwidth configuration is 100 MHz and $0 \leq RB_{start} < \text{Ceil}(\frac{1}{3} \, N_{RB})$ or $\text{Ceil}(\frac{2}{3} \, N_{RB}) \leq RB_{start} \leq N_{RB} - L_{CRB}$:

$MPR_{narrow} = 2.5$ dB, when $BW_{alloc,RB}$ is less than or equal to 1.44 MHz, $MPR_{narrow} = 2.0$ dB, when 1.44 MHz $< BW_{alloc,RB} <= 4.32$ MHz, otherwise $MPR_{narrow} = 0$ dB.

For transmission bandwidth configuration equal to or larger than 400 MHz, it may be that $MPR_{narrow} = 2.5$ dB, when $BW_{alloc,RB}$ is less than or equal to 1.44 MHz, and $0 \leq RB_{start} < \text{Ceil}(\frac{1}{3} \, N_{RB})$ or $\text{Ceil}(\frac{2}{3} N_{RB}) \leq RB_{start} \leq N_{RB} - L_{CRB}$, where $BW_{alloc,RB}$ is the bandwidth of the RB allocation size.

$MPR_{WT}$ is the maximum power reduction due to modulation orders, transmission bandwidth configurations listed in Table 20, and waveform types. $MPR_{WT}$ is defined in Table 14-16 or Table 17-19.

3. MPR CA

In FR2-1, PC3 MPR CA may be applied to PC2. For FR2-2 similar approach may be proposed.

Proposal 4: Apply FR2-2 PC3 MPR CA to PC2

General UE/network operations and specifications for FR2-2 Handheld UE (PC3) and Vehicular UE (PC2) UEs may be as follows.

The UE may inform the network that it is a power class 3 UE or power class 2 UE supporting n263.

The network may inform the UE of the UL CBW (channel bandwidth) and MO (modulation order) to be used. Then, the UE may transmit the UL signal by reducing power by the corresponding MPR value from its maximum transmission power.

Corresponding MPR values may be shown in Tables 14-16 or Tables 17-19.

As shown in Tables 14-16 or Tables 17-19, the corresponding MPR value may be defined differently depending on the location of the RB. For example, it can be divided into 'inner RB allocation, Region 1' and 'Edge RB allocation'.

The MPR value may be verified through a conformance test prior to release of the UE.

The following drawings are made to explain a specific example of the present specification. Since the names of specific devices or names of specific signals/messages/fields described in the drawings are provided as examples, the technical features of the present specification are not limited to the specific names used in the drawings below.

Figure 9:
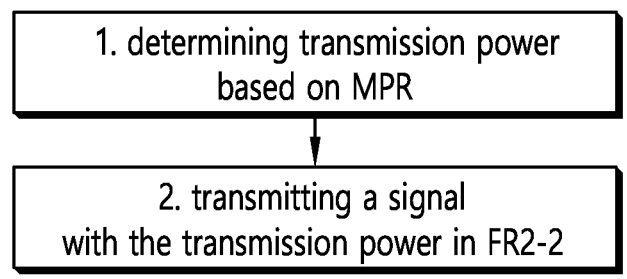
FIG. 9 shows a procedure of a UE according to the disclosure of the present specification.

FIG. 9 shows a procedure of a UE according to the disclosure of the present specification.

1. The UE may determine transmission power based on MPR (maximum power reduction).

2. The UE may transmit a signal with the transmission power in FR2-2.

The UE may be a power class 2 UE or power class 3.

The MPR may be configured, based on channel bandwidth, RB (resource block) allocation and modulation type, The MPR may be 6.0 dB or less, based on i) the channel bandwidth being 800 MHz, ii) the RB allocation being Inner RB allocations, iii) the modulation type being DFT-s-OFDM (Discrete Fourier Transform-spread-orthogonal frequency division multiplexing) and 16 QAM (Quadrature Amplitude Modulation), The MPR may be 6.5 dB or less, based on i) the channel bandwidth being 800 MHz, ii) the RB allocation being Inner RB allocations, iii) the modulation type being CP-OFDM (Cyclic Prefix-OFDM) and QPSK (Quadrature phase shift keying), The MPR may be 8.0 dB or less, based on i) the channel bandwidth being 800 MHz, ii) the RB allocation being Inner RB allocations, iii) the modulation type being CP-OFDM and 16 QAM, The MPR may be 10.5 dB or less, based on i) the channel bandwidth being 800 MHz, ii) the RB allocation being Inner RB allocations, iii) the modulation type being CP-OFDM and 64 QAM, The MPR may be 4.0 dB or less, based on i) the channel bandwidth being 800 MHz, ii) the RB allocation being Edge RB allocations, iii) the modulation type being DFT-s-OFDM and Pi/2 BPSK (binary phase shift keying), The MPR may be 4.0 dB or less, based on i) the channel bandwidth being 800 MHz, ii) the RB allocation being Edge RB allocations, iii) the modulation type being DFT-s-OFDM and QPSK, The MPR may be 6.0 dB or less, based on i) the channel bandwidth being 800 MHz, ii) the RB allocation being Edge RB allocations, iii) the modulation type being DFT-s-OFDM and 16 QAM, The MPR may be 6.5 dB or less, based on i) the channel bandwidth being 800 MHz, ii) the RB allocation being Edge RB allocations, iii) the modulation type being CP-OFDM and QPSK, The MPR may be 8.0 dB or less, based on i) the channel bandwidth being 800 MHz, ii) the RB allocation being Edge RB allocations, iii) the modulation type being CP-OFDM and 16 QAM, The MPR may be 10.5 dB or less, based on i) the channel bandwidth being 800 MHz, ii) the RB allocation being Edge RB allocations, iii) the modulation type being CP-OFDM and 64 QAM.

Figure 10:
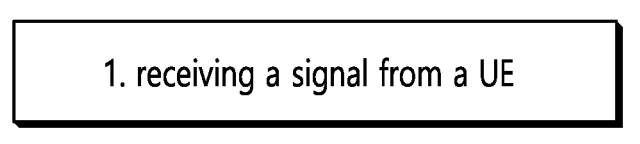

FIG. 10 shows a procedure of a base station according to the disclosure of the present specification.

1. The base station may receive a signal from a UE.

The UE may be a power class 2 UE or power class 3.

The MPR may be configured, based on channel bandwidth, RB (resource block) allocation and modulation type, The MPR may be 6.0 dB or less, based on i) the channel bandwidth being 800 MHz, ii) the RB allocation being Inner RB allocations, iii) the modulation type being DFT-s-OFDM (Discrete Fourier Transform-spread-orthogonal frequency division multiplexing) and 16 QAM (Quadrature Amplitude Modulation), The MPR may be 6.5 dB or less, based on i) the channel bandwidth being 800 MHz, ii) the RB allocation being Inner RB allocations, iii) the modulation type being CP-OFDM (Cyclic Prefix-OFDM) and QPSK (Quadrature phase shift keying), The MPR may be 8.0 dB or less, based on i) the channel bandwidth being 800 MHz, ii) the RB allocation being Inner RB allocations, iii) the modulation type being CP-OFDM and 16 QAM, The MPR may be 10.5 dB or less, based on i) the channel bandwidth being 800 MHz, ii) the RB allocation being Inner RB allocations, iii) the modulation type being CP-OFDM and 64 QAM, The MPR may be 4.0 dB or less, based on i) the channel bandwidth being 800 MHz, ii) the RB allocation being Edge RB allocations, iii) the modulation type being DFT-s-OFDM and Pi/2 BPSK (binary phase shift keying), The MPR may be 4.0 dB or less, based on i) the channel bandwidth being 800 MHz, ii) the RB allocation being Edge RB allocations, iii) the modulation type being DFT-s-OFDM and QPSK, The MPR may be 6.0 dB or less, based on i) the channel bandwidth being 800 MHz, ii) the RB allocation being Edge RB allocations, iii) the modulation type being DFT-s-OFDM and 16 QAM, The MPR may be 6.5 dB or less, based on i) the channel bandwidth being 800 MHz, ii) the RB allocation being Edge RB allocations, iii) the modulation type being CP-OFDM and QPSK, The MPR may be 8.0 dB or less, based on i) the channel bandwidth being 800 MHz, ii) the RB allocation being Edge RB allocations, iii) the modulation type being CP-OFDM and 16 QAM, The MPR may be 10.5 dB or less, based on i) the channel bandwidth being 800 MHz, ii) the RB allocation being Edge RB allocations, iii) the modulation type being CP-OFDM and 64 QAM.

Hereinafter, a processor for providing communication in a wireless communication system according to some embodiments of the present specification will be described.

The processor may perform operation, comprising: determining transmission power based on MPR (maximum power reduction); and transmitting a signal with the transmission power in FR2-2, wherein the UE is a power class 2 UE or power class 3, wherein the MPR is configured, based on channel bandwidth, RB (resource block) allocation and modulation type.

Hereinafter, a non-volatile computer-readable medium storing one or more instructions for providing communication according to some embodiments of the present specification will be described.

According to some embodiments of the present disclosure, the technical features of the present disclosure may be directly implemented as hardware, software executed by a processor, or a combination of the two. For example, in wireless communication, a method performed by a wireless device may be implemented in hardware, software, firmware, or any combination thereof. For example, the software may reside in RAM memory, flash memory, ROM memory, EPROM memory, EEPROM memory, registers, hard disk, removable disk, CD-ROM, or other storage medium.

Some examples of a storage medium are coupled to the processor such that the processor can read information from the storage medium. Alternatively, the storage medium may be integrated into the processor. The processor and storage medium may reside in the ASIC. For another example, a processor and a storage medium may reside as separate components.

Computer-readable media can include tangible and non-volatile computer-readable storage media.

For example, non-volatile computer-readable media may include random access memory (RAM), such as synchronization dynamic random access memory (SDRAM), read-only memory (ROM), or non-volatile random access memory (NVRAM). Read-only memory (EEPROM), flash memory, magnetic or optical data storage media, or other media that can be used to store instructions or data structures or Non-volatile computer readable media may also include combinations of the above.

Further, the methods described herein may be realized at least in part by computer-readable communication media that carry or carry code in the form of instructions or data structures and that can be accessed, read, and/or executed by a computer.

According to some embodiments of the present disclosure, a non-transitory computer-readable medium has one or more instructions stored thereon. The stored one or more instructions may be executed by a processor of the UE.

The stored one or more stored instructions cause processors to: determining transmission power based on □PR (maximum power reduction); and transmitting a signal with the transmission power in FR2-2, wherein a UE (user equipment) including the non-volatile computer readable storage medium is a power class 2 UE or power class 3, wherein the MPR is configured, based on channel bandwidth, RB (resource block) allocation and modulation type, wherein the MPR is 6.0 dB or less, based on i) the channel bandwidth being 800 MHz, ii) the RB allocation being Inner RB allocations, iii) the modulation type being DFT-s-OFDM (Discrete Fourier Transform-spread-orthogonal frequency division multiplexing) and 16 QAM (Quadrature Amplitude Modulation), wherein the MPR is 6.5 dB or less, based on i) the channel bandwidth being 800 MHz, ii) the RB allocation being Inner RB allocations, iii) the modulation type being CP-OFDM (Cyclic Prefix-OFDM) and QPSK (Quadrature phase shift keying), wherein the MPR is 8.0 dB or less, based on i) the channel bandwidth being 800 MHz, ii) the RB allocation being Inner RB allocations, iii) the modulation type being CP-OFDM and 16 QAM, wherein the MPR is 10.5 dB or less, based on i) the channel bandwidth being 800 MHz, ii) the RB allocation being Inner RB allocations, iii) the modulation type being CP-OFDM and 64 QAM, wherein the MPR is 4.0 dB or less, based on i) the channel bandwidth being 800 MHz, ii) the RB allocation being Edge RB allocations, iii) the modulation type being DFT-s-OFDM and Pi/2 BPSK (binary phase shift keying), wherein the MPR is 4.0 dB or less, based on i) the channel bandwidth being 800 MHz, ii) the RB allocation being Edge RB allocations, iii) the modulation type being DFT-s-OFDM and QPSK, wherein the MPR is 6.0 dB or less, based on i) the channel bandwidth being 800 MHz, ii) the RB allocation being Edge RB allocations, iii) the modulation type being DFT-s-OFDM and 16 QAM, wherein the MPR is 6.5 dB or less, based on i) the channel bandwidth being 800 MHz, ii) the RB allocation being Edge RB allocations, iii) the modulation type being CP-OFDM and QPSK, wherein the MPR is 8.0 dB or less, based on i) the channel bandwidth being 800 MHz, ii) the RB allocation being Edge RB allocations, iii) the modulation type being CP-OFDM and 16 QAM, wherein the MPR is 10.5 dB or less, based on i) the channel bandwidth being 800 MHz, ii) the RB allocation being Edge RB allocations, iii) the modulation type being CP-OFDM and 64 QAM.

The present specification may have various effects.

For example, through the device disclosed of the present specification, a signal can be sent by determining transmission power by applying the proposed MPR.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

What is claimed is:

1. A UE (user equipment), comprising:
a transceiver to transmit a signal and to receive a signal; and
a processor to control the transceiver,
wherein the UE is a power class 2 UE or power class 3,
wherein the processor determines transmission power based on MPR (maximum power reduction),
wherein the transceiver transmits a signal with the transmission power in FR2-2 (Frequency Range 2-2) band,
wherein the FR2-2 band is a band from 52600 MHz to 71000 MHz,
wherein the MPR is determined, based on channel bandwidth, RB (resource block) allocation and modulation type,
wherein the MPR is 6.0 dB or less, based on i) the channel bandwidth being 800 MHz, ii) the RB allocation being Inner RB allocations, iii) the modulation type being DFT-s-OFDM (Discrete Fourier Transform-spread-orthogonal frequency division multiplexing) and 16 QAM (Quadrature Amplitude Modulation).

2. The UE of claim 1, wherein the MPR is 6.5 dB or less, based on i) the channel bandwidth being 800 MHz, ii) the RB allocation being Inner RB allocations, iii) the modulation type being CP-OFDM (Cyclic Prefix-OFDM) and QPSK (Quadrature phase shift keying).

3. The UE of claim 1, wherein the MPR is 8.0 dB or less, based on i) the channel bandwidth being 800 MHz, ii) the RB allocation being Inner RB allocations, iii) the modulation type being CP-OFDM and 16 QAM.

4. The UE of claim 1, wherein the MPR is 10.5 dB or less, based on i) the channel bandwidth being 800 MHz, ii) the RB allocation being Inner RB allocations, iii) the modulation type being CP-OFDM and 64 QAM.

5. The UE of claim 1, wherein the MPR is 4.0 dB or less, based on i) the channel bandwidth being 800 MHz, ii) the RB allocation being Edge RB allocations, iii) the modulation type being DFT-s-OFDM and Pi/2 BPSK (binary phase shift keying).

6. The UE of claim 1, wherein the MPR is 4.0 dB or less, based on i) the channel bandwidth being 800 MHz, ii) the RB allocation being Edge RB allocations, iii) the modulation type being DFT-s-OFDM and QPSK.

7. The UE of claim 1, wherein the MPR is 6.0 dB or less, based on i) the channel bandwidth being 800 MHz, ii) the RB allocation being Edge RB allocations, iii) the modulation type being DFT-s-OFDM and 16 QAM.

8. The UE of claim 1, wherein the MPR is 6.5 dB or less, based on i) the channel bandwidth being 800 MHz, ii) the RB allocation being Edge RB allocations, iii) the modulation type being CP-OFDM and QPSK.

9. The UE of claim 1, wherein the MPR is 8.0 dB or less, based on i) the channel bandwidth being 800 MHz, ii) the RB allocation being Edge RB allocations, iii) the modulation type being CP-OFDM and 16 QAM.

10. The UE of claim 1, wherein the MPR is 10.5 dB or less, based on i) the channel bandwidth being 800 MHz, ii) the RB allocation being Edge RB allocations, iii) the modulation type being CP-OFDM and 64 QAM.

11. A method for performing communication, performed by a UE (user equipment), comprising:
determining transmission power based on MPR (maximum power reduction); and
transmitting a signal with the transmission power in FR2-2 (Frequency Range 2-2) band,
wherein the FR2-2 band is a band from 52600 MHz to 71000 MHz,
wherein the UE is a power class 2 UE or power class 3,
wherein the MPR is determined, based on channel bandwidth, RB (resource block) allocation and modulation type,
wherein the MPR is 6.0 dB or less, based on i) the channel bandwidth being 800 MHz, ii) the RB allocation being Inner RB allocations, iii) the modulation type being DFT-s-OFDM (Discrete Fourier Transform-spread-orthogonal frequency division multiplexing) and 16 QAM (Quadrature Amplitude Modulation),
wherein the MPR is 6.5 dB or less, based on i) the channel bandwidth being 800 MHz, ii) the RB allocation being Inner RB allocations, iii) the modulation type being CP-OFDM (Cyclic Prefix-OFDM) and QPSK (Quadrature phase shift keying),
wherein the MPR is 8.0 dB or less, based on i) the channel bandwidth being 800 MHz, ii) the RB allocation being Inner RB allocations, iii) the modulation type being CP-OFDM and 16 QAM,
wherein the MPR is 10.5 dB or less, based on i) the channel bandwidth being 800 MHz, ii) the RB allocation being Inner RB allocations, iii) the modulation type being CP-OFDM and 64 QAM,
wherein the MPR is 4.0 dB or less, based on i) the channel bandwidth being 800 MHz, ii) the RB allocation being Edge RB allocations, iii) the modulation type being DFT-s-OFDM and Pi/2 BPSK (binary phase shift keying),
wherein the MPR is 4.0 dB or less, based on i) the channel bandwidth being 800 MHz, ii) the RB allocation being Edge RB allocations, iii) the modulation type being DFT-s-OFDM and QPSK,
wherein the MPR is 6.0 dB or less, based on i) the channel bandwidth being 800 MHz, ii) the RB allocation being Edge RB allocations, iii) the modulation type being DFT-s-OFDM and 16 QAM,
wherein the MPR is 6.5 dB or less, based on i) the channel bandwidth being 800 MHz, ii) the RB allocation being Edge RB allocations, iii) the modulation type being CP-OFDM and QPSK,
wherein the MPR is 8.0 dB or less, based on i) the channel bandwidth being 800 MHz, ii) the RB allocation being Edge RB allocations, iii) the modulation type being CP-OFDM and 16 QAM,
wherein the MPR is 10.5 dB or less, based on i) the channel bandwidth being 800 MHz, ii) the RB allocation being Edge RB allocations, iii) the modulation type being CP-OFDM and 64 QAM.

12. A non-volatile computer readable storage medium having recorded instructions,
wherein the instructions, based on being executed by one or more processors, cause the one or more processors to:
determining transmission power based on MPR (maximum power reduction); and
transmitting a signal with the transmission power in FR2-2 (Frequency Range 2-2) band,
wherein the FR2-2 band is a band from 52600 MHz to 71000 MHz, wherein a UE (user equipment) including the non-volatile computer readable storage medium is a power class 2 UE or power class 3, wherein the MPR is determined, based on channel bandwidth, RB (resource block) allocation and modulation type, wherein the MPR is 6.0 dB or less, based on i) the channel bandwidth being 800 MHz, ii) the RB allocation being Inner RB allocations, iii) the modulation type being DFT-s-OFDM (Discrete Fourier Transform-spread-orthogonal frequency division multiplexing) and 16 QAM (Quadrature Amplitude Modulation), wherein the MPR is 6.5 dB or less, based on i) the channel bandwidth being 800 MHz, ii) the RB allocation being Inner RB allocations, iii) the modulation type being CP-OFDM (Cyclic Prefix-OFDM) and QPSK (Quadrature phase shift keying), wherein the MPR is 8.0 dB or less, based on i) the channel bandwidth being 800 MHz, ii) the RB allocation being Inner RB allocations, iii) the modulation type being CP-OFDM and 16 QAM, wherein the MPR is 10.5 dB or less, based on i) the channel bandwidth being 800 MHz, ii) the RB allocation being Inner RB allocations, iii) the modulation type being CP-OFDM and 64 QAM, wherein the MPR is 4.0 dB or less, based on i) the channel bandwidth being 800 MHz, ii) the RB allocation being Edge RB allocations, iii) the modulation type being DFT-s-OFDM and Pi/2 BPSK (binary phase shift keying), wherein the MPR is 4.0 dB or less, based on i) the channel bandwidth being 800 MHz, ii) the RB allocation being Edge RB allocations, iii) the modulation type being DFT-s-OFDM and QPSK, wherein the MPR is 6.0 dB or less, based on i) the channel bandwidth being 800 MHz, ii) the RB allocation being Edge RB allocations, iii) the modulation type being DFT-s-OFDM and 16 QAM, wherein the MPR is 6.5 dB or less, based on i) the channel bandwidth being 800 MHz, ii) the RB allocation being Edge RB allocations, iii) the modulation type being CP-OFDM and QPSK, wherein the MPR is 8.0 dB or less, based on i) the channel bandwidth being 800 MHz, ii) the RB allocation being Edge RB allocations, iii) the modulation type being CP-OFDM and 16 QAM, wherein the MPR is 10.5 dB or less, based on i) the channel bandwidth being 800 MHz, ii) the RB allocation being Edge RB allocations, iii) the modulation type being CP-OFDM and 64 QAM.

* * * * *